(12) United States Patent
Pinoncely et al.

(10) Patent No.: US 12,138,739 B2
(45) Date of Patent: Nov. 12, 2024

(54) AUTOMATIC ADJUSTING HYDRO-MECHANICAL FLUID NOZZLE APPARATUS

(71) Applicant: GM GLOBAL TECHNOLOGY OPERATIONS LLC, Detroit, MI (US)

(72) Inventors: Eduardo Pinoncely, Brighton, MI (US); Joseph Gerard Lovasz, Ortonville, MI (US); Scott A. Hucker, Ortonville, MI (US)

(73) Assignee: GM GLOBAL TECHNOLOGY OPERATIOS LLC, Detroit, MI (US)

( * ) Notice: Subject to any disclaimer, the term of this patent is extended or adjusted under 35 U.S.C. 154(b) by 763 days.

(21) Appl. No.: 17/303,149

(22) Filed: May 21, 2021

(65) Prior Publication Data
US 2022/0371156 A1 Nov. 24, 2022

(51) Int. Cl.
*B24B 53/007* (2006.01)
*B05B 15/68* (2018.01)

(52) U.S. Cl.
CPC ............ *B24B 53/007* (2013.01); *B05B 15/68* (2018.02)

(58) Field of Classification Search
CPC ... B24B 53/007; B24B 53/013; B24B 53/095; B24B 55/02; B24B 55/03; B24B 55/045; B24B 55/12; B24B 57/02; B05B 15/68; B05B 15/62; B05B 15/628; B05B 15/65; B05B 15/652; B05B 15/70; B05B 15/74; B05B 12/124; Y10T 408/46
USPC .......................... 451/444, 446, 449, 450, 254
See application file for complete search history.

(56) References Cited

U.S. PATENT DOCUMENTS

| | | | | |
|---|---|---|---|---|
| 3,256,647 A * | 6/1966 | Norman | ................... | B24B 55/02 D15/126 |
| 4,176,500 A * | 12/1979 | Bourgoin | ................. | B24B 55/02 451/450 |
| 4,320,600 A * | 3/1982 | Bourgoin | ................. | B24B 55/02 451/450 |
| 4,712,334 A * | 12/1987 | Ikezaki | ................. | B24B 53/007 125/11.01 |
| 4,929,130 A * | 5/1990 | Diebolt | ................... | B24B 55/02 29/DIG. 87 |
| 6,454,636 B1 * | 9/2002 | Iwabuchi | ................. | B24B 57/02 451/450 |
| 6,648,738 B2 * | 11/2003 | Eto | ......................... | B24B 9/146 451/449 |
| 7,815,493 B2 * | 10/2010 | Pflager | ................... | B24B 47/26 451/450 |

(Continued)

FOREIGN PATENT DOCUMENTS

JP 2012179692 A 9/2012
SU 1014691 A1 4/1983

*Primary Examiner* — Robert F Neibaur
(74) *Attorney, Agent, or Firm* — Lorenz & Kopf LLP

(57) ABSTRACT

Apparatus are provided for automatic repositioning of fluid nozzles when operating on a workpiece with a tool. The apparatus includes a nozzle assembly configured to convey a fluid to a target zone defined on the workpiece and/or on the tool. The target zone has a location that varies over time. A spring applies a spring force to bias the nozzle assembly toward the target zone, and moves the nozzle assembly as the location of the target zone varies. The nozzle assembly moves to a position relative to the target zone by a combination of action of the spring force and of any hydrodynamic force of the fluid, when moving through the nozzle assembly.

20 Claims, 4 Drawing Sheets

(56) References Cited

U.S. PATENT DOCUMENTS

2015/0158144 A1\* 6/2015 Diehl .................... B23Q 3/062
451/450

\* cited by examiner

AUTOMATIC ADJUSTING HYDRO-MECHANICAL FLUID NOZZLE APPARATUS

INTRODUCTION

The present disclosure generally relates to workpiece processing in the presence of an applied fluid, and more specifically relates to fluid application via a nozzle that automatically adjusts position under hydro-mechanical and spring action for reduced cost, improved part surface quality, reduced tool change downtime and/or increased throughput.

Various machining processes are used for working parts such as to remove or otherwise alter the shape of the workpiece's material. For example, cutting, stamping and/or other operations may be used to remove material from workpieces, and various forming operations may be used to change a workpieces shape under applied force. For successful machining, clean, cooled and well-maintained tools and their interfaces with workpieces ensure precision surface quality and speed. Fluid may be applied during metalworking operations for cooling, lubrication and/or cleaning purposes. In various operations, chips/residue may accumulate or stick to a tool. For example, material may tend to accumulate on a grinding wheel. In such an application, scrubber nozzles maybe implemented with high-pressure (3500-7000 Kilopascal) targeting the grinding wheel after the grinding zone to remove chips/residue from the wheel structure in preparation for operating on the workpiece.

In addition to scrubber nozzles, fluid may be applied to targeted zones of metalworking applications by various types of nozzles. During machine setup, the nozzles may be fixed in a position and aimed at the targeted zone. Nozzle repositioning may be needed from time-to-time to maintain proper targeting. Repositioning may be accomplished by manual adjustment, which requires machine downtime to complete, which introduces inefficiencies.

It is desirable to provide more efficient and effective targeting of fluid nozzles for material working/machining operations to provide reduced cost, improved part surface quality, reduced downtime and/or increased throughput. Furthermore, other desirable features and characteristics of the present invention will become apparent from the subsequent detailed description and the appended claims, taken in conjunction with the accompanying drawings and the foregoing technical field and background.

SUMMARY

Apparatus are provided for automatic fluid nozzle adjustment. In various embodiments, an apparatus for operating on a workpiece with a tool includes a nozzle assembly configured to convey a fluid to a target zone defined on the workpiece and/or the tool. The target zone has a location that varies over time. A spring applies a spring force to bias the nozzle assembly toward the target zone. The spring acts to move the nozzle assembly as the location of the target zone varies. The nozzle assembly is configured to move to a position relative to the target zone by a combination of action of the spring force and of any hydrodynamic force of the fluid when moving through the nozzle assembly.

In additional embodiments, the tool includes a cutting surface, and the position of the nozzle assembly varies as a result of wear of the cutting surface.

In additional embodiments, a guide engages the nozzle assembly to direct movement of the nozzle assembly. The guide includes a slot defining a path and the nozzle assembly follows the path defined by the slot.

In additional embodiments, the position of the nozzle assembly is determined by a balance between hydrodynamic force and the spring force.

In additional embodiments, the nozzle assembly contacts the tool when the tool is not rotating.

In additional embodiments, the tool comprises a grinding wheel.

In additional embodiments, the nozzle assembly comprises a scrubber nozzle for cleaning the grinding wheel.

In additional embodiments, a stop is disposed an initial distance from the nozzle assembly to limit movement of the nozzle assembly away from the tool in response to the hydrodynamic force.

In additional embodiments, the stop moves toward the tool with the nozzle assembly, to maintain the initial distance.

In additional embodiments, the stop is held from moving away from the nozzle assembly by a lock when the nozzle assembly moves under the hydrodynamic force.

In a number of additional embodiments, an apparatus for operating on a workpiece with a tool includes a nozzle assembly that conveys a fluid to a target zone defined on the tool and/or the workpiece. The target zone has a location that varies over time. A spring applies a spring force to bias the nozzle assembly toward the target zone. The spring moves the nozzle assembly as the location of the target zone varies. A guide engages the nozzle assembly to direct movement of the nozzle assembly. The nozzle assembly moves to a position relative to the target zone by a combination of action of the spring force and of any hydrodynamic force of the fluid.

In additional embodiments, the tool includes an abrasive layer, and the position of the nozzle assembly varies as a result of wear of the abrasive layer.

In additional embodiments, the guide includes a slot, and a pin on the nozzle assembly extends into the slot.

In additional embodiments, the position of the nozzle assembly is determined by a balance between the hydrodynamic force and the spring force. The balance sets the nozzle assembly at a preferred gap from the tool.

In additional embodiments, the nozzle assembly rests against the tool when the fluid is turned off to the nozzle assembly.

In additional embodiments, the nozzle assembly is a scrubber nozzle that cleans the tool. A pump pressurizes the fluid through the scrubber nozzle.

In additional embodiments, a stop is disposed an initial distance from the nozzle assembly. The nozzle assembly moves toward the stop reducing the initial distance in response to the hydrodynamic force. The stop limits movement of the nozzle assembly in response to the hydrodynamic force.

In additional embodiments, the stop moves toward the tool with the nozzle assembly, as the tool wears.

In additional embodiments, the action of the spring force maintains a preferred gap between the tool and the workpiece, as the tool wears.

In a number of other embodiments, an apparatus for operating on a workpiece with a tool includes a nozzle assembly that conveys a fluid to a target zone defined on the tool. The target zone has a location that varies over time as the tool wears. A spring applies a spring force to bias the nozzle assembly toward the target zone. The spring moves the nozzle assembly toward the tool as the location of the target zone varies as the tool wears. A guide engages the nozzle assembly and defines a slot that directs movement of the nozzle assembly. The nozzle assembly follows the slot and moves to a position relative to the target zone by seeking a balance between the spring force and any hydrodynamic force of the fluid, when the fluid is moving.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

As disclosed herein, automatic fluid nozzle repositioning is accomplished by a combination of a mechanical force and a hydrodynamic force. An apparatus for working a workpiece with a tool includes a nozzle assembly configured to convey a fluid to a target zone defined on at least one of the workpiece and/or the tool. The target zone has a position that varies over time such as for example, as due to wear of the tool's cutting surface, as a result of material removal or forming of the workpiece, or as a result of other processing factors or combination of factors. A spring applies a mechanical bias to the nozzle assembly in a direction toward the target zone. The spring moves the nozzle assembly as the position varies. A guide may engage the nozzle assembly to direct its movement. In a number of embodiments, the engagement may be direct, or indirect through intervening components of the apparatus. The nozzle assembly is positioned relative to the target zone by a combination of action of the mechanical spring force and of a hydrodynamic force of the fluid moving through the nozzle assembly. Movement of the nozzle assembly may be limited by a mechanical positive stop that may travel with the nozzle assembly during repositioning.

Figure 1:
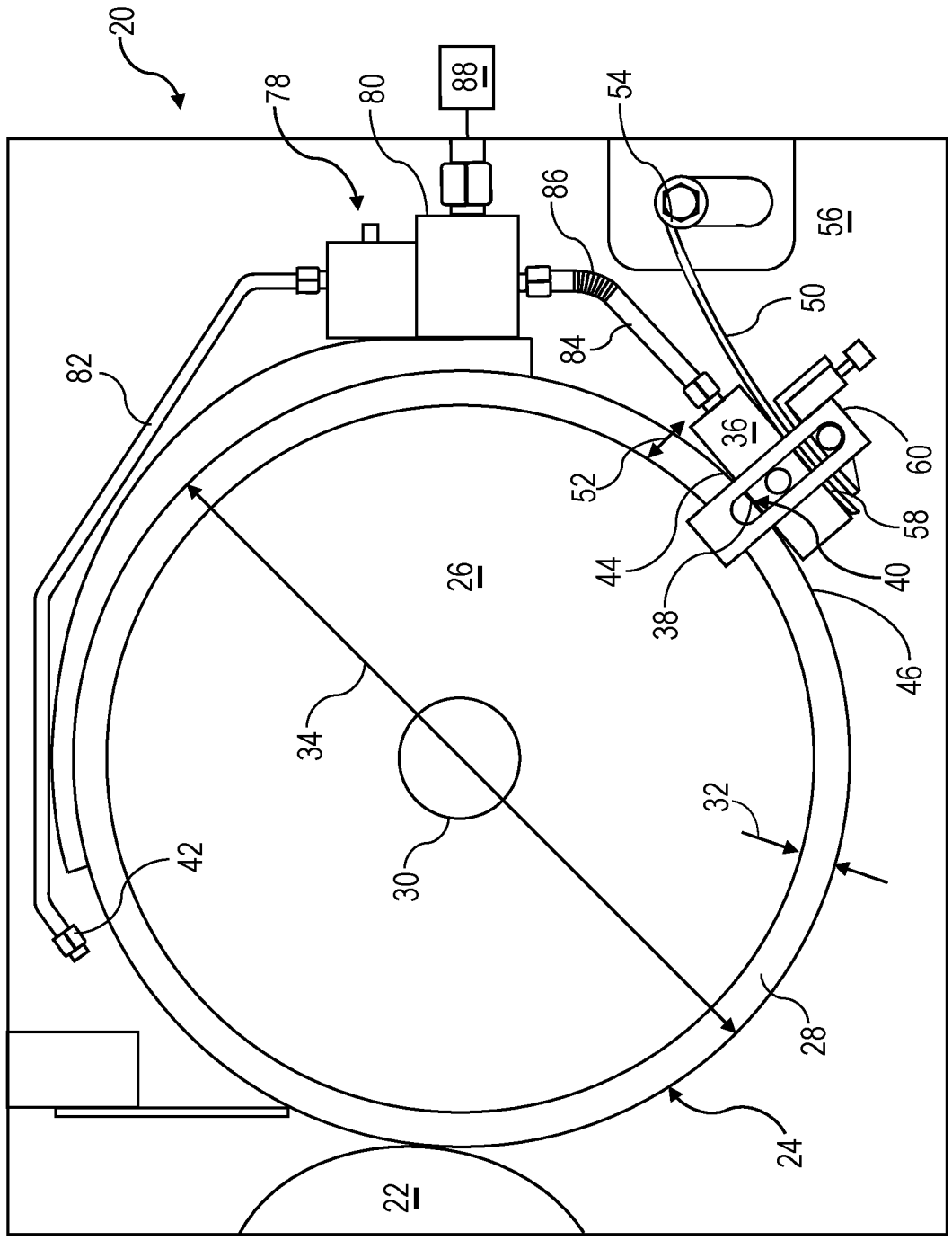
FIG. 1 is a schematic plan view of a material working apparatus, in accordance with various embodiments.
Figure 2:
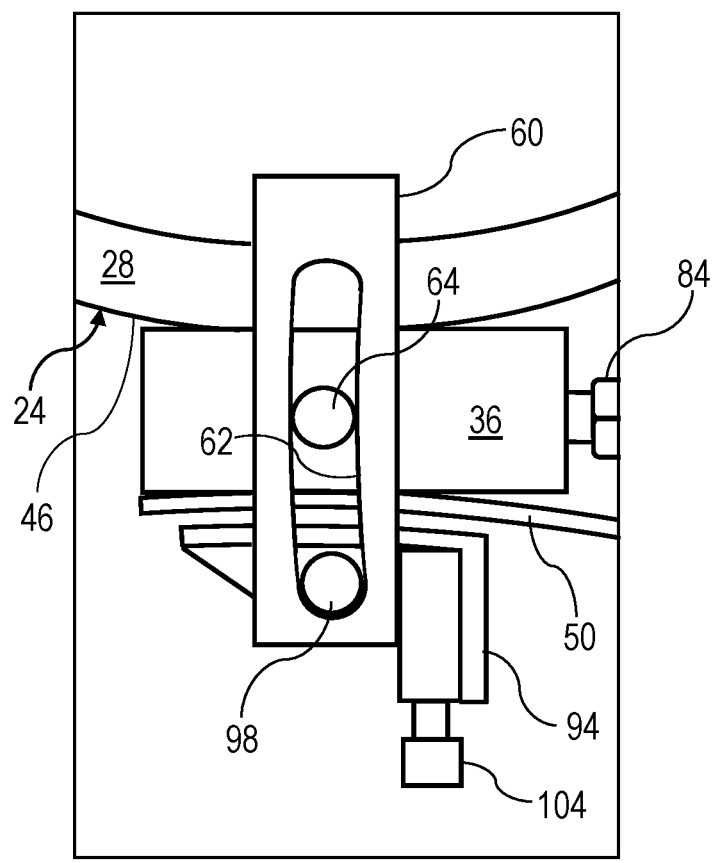
FIG. 2 is a schematic, detail illustration of the nozzle area of the apparatus of FIG. 1, in accordance with various embodiments.

Referring to FIGS. 1 and 2, illustrated is an apparatus 20 for operating on a workpiece 22 with a tool 24. In the current example, the tool 24 is embodied in a grinding type cutting application. In other embodiments, the tool 24 may carry out other operations on the workpiece 24 such as by forming, shaping, broaching, drawing, turning, bending, boring, or other operations where a fluid is applied to the operation. As illustrated, the apparatus 20 removes material from the workpiece 22 by cutting via a grinding wheel 26 which serves as a part of the tool 24. The grinding wheel 26 includes an abrasive layer 28 disposed on a hub 30. The thickness 32 of the abrasive layer 28, which wears during use, is a determinant in the timespan between replacements of the grinding wheel 26 and as such, is preferably maximized to reduce downtime. In addition, as the abrasive layer 28 wears, the diameter 34 of the grinding wheel 26 changes, which may impact various operational aspects of the apparatus 20 and of the resulting surface of the workpiece 22. Impacted aspects of the application may be influenced by applied fluids for cooling, lubrication and/or cleaning. As an example, a nozzle assembly 36 may be embodied as a scrubber to clean the grinding wheel 26 or generally to prepare the tool 24 for operating on the workpiece. In other contemplated applications, the nozzle assembly 36 may be employed for other purposes, such as for cooling/heat management, lubrication, or others.

In the current embodiment, the scrubbing nozzle(s) 38 are employed to direct a stream of fluid directed at a target zone 40 of the grinding wheel 26, such as to remove chips/residue from the abrasive layer 28 in preparation for contact with the workpiece 22. The preparation may be carried out to improve grinding effectiveness and the quality of the ground surface that is produced o0n the workpiece 22. For effectiveness, the fluid may be delivered under high pressure such as 7000-10,000 kilopascal, with flow rates such as 3-4 liters per minute per centimeter of width of the grinding wheel 26. In the current embodiment, a total of approximately 20 liters per minute may be employed. In other embodiments, other pressures and flow rates may be employed. A number of nozzles 38 may be arrayed across the width of the grinding wheel 26 for effective coverage of the target zone 40. The fluid stream may be directed radial to, or slightly opposing the direction of rotation of the grinding wheel 26 to remove debris. The fluid used may be the same as that used for cooling/lubrication during working of the workpiece 22, such as through coolant nozzle 42, for compatibility. The nozzle spray pattern may be a flat fan-shape, conical, or another pattern. The face 44 of the nozzle assembly 36 may be placed in close proximity to the outer perimeter surface/cutting surface 46 of the grinding wheel 26, and may be disposed with a preferred gap 48 (FIG. 4), during operation. The gap 48 may be set at a variety of preferred sizes. In embodiments, the nozzle face 44 may be disposed within three millimeters of the tool 24, when in operation. In other embodiments, the nozzle face 44 may be disposed within 0.5 millimeters of the tool 24, when in operation.

The tool 24, and specifically in this example the abrasive layer 28 of the grinding wheel 26, may comprise any type of abrasive suitable for the application such as aluminum oxide, silicon carbide or diamond. In the present example, the abrasive layer 28 may be of the cubic boron nitride (CBN) type, bonded to the wheel hub 30. The thickness 32 may vary, and due to advantages of the current embodiment may be relatively thick for the CBN type of abrasive, such as twenty millimeters or more. In the case of a static scrubber nozzle, as the abrasive layer 28 wears, the cutting surface 46 would progressively become further and further away from the nozzle face 44. In the current embodiment, the preferred distance between the cutting surface 46 and the nozzle face 44 is three millimeters or less. Accordingly as disclosed herein, the nozzle assembly 36 moves as the abrasive layer 28 wears to maintain the preferred gap 48. In other applications the preferred gap 48 may be maintained during other changes in location of the target zone, such as due to changes in surfaces of the workpiece, or other factors. Accordingly, the nozzle assembly 36 automatically repositions relative to the target zone 40, regardless of the reason for movement of the target zone 40. In the current embodiment, the target zone 40 is on the tool 24. In other embodiments, the target zone 40 may be on the workpiece 22, or at the interface between the tool 24 and the workpiece 22.

To maintain the gap 48, the nozzle assembly 36 is mounted on a spring 50. The spring 50 may be any type of elastic/flexible element that generally moves the nozzle assembly 36 toward the target zone 40/cutting surface 46, and that is compressible/flexible to allow the nozzle assembly 36 to move off the surface 46 of the tool 24. In the current embodiment, the spring 50 is a leaf-type spring. In other embodiments, a coiled or wound spring such as a clockspring may be used. In additional embodiments, an elastic element or another type of spring element may be used. The type of spring 50 is selected to provide a constant spring rate over a range of travel 52. In this embodiment, the range of travel 52 is at least twenty millimeters, which is equal to the thickness 32 of the abrasive layer 28. The spring 50 includes one end 54 attached to the frame 56 of the apparatus 20, and another end 58 to which the nozzle assembly 36 is coupled. A guide 60 is also attached to the frame 56 and includes a slot 62 into which a pin 64 of the nozzle assembly 36 extends. The nozzle assembly 36 may move relative to the frame 56 and the tool 24 as directed by the guide 60 with the pin 64 riding within the slot 62. The slot 62 is shaped as an elongated channel in the guide 60 with an arc to match the path the pin 64 will follow as the spring 50 flexes to move the nozzle assembly 36. The elements are arranged so that the path is designed to keep the nozzle face 44 in contact with, or in close proximity to, the cutting surface 46.

Figure 3:
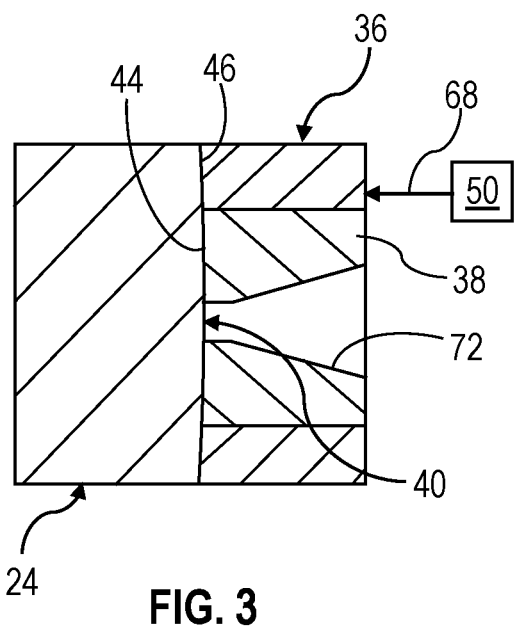
FIG. 3 is a schematic, detail illustration of the nozzle area of the apparatus of FIG. 1 shown in a state with the tool stopped, in accordance with various embodiments.

As shown in FIG. 3, in the current embodiment the spring 50 applies a force 68 that urges the nozzle face 44 against the tool 24 and contacting the cutting surface 46 when the tool 24 is not moving and no fluid is being supplied through the nozzle assembly 36. The nozzle assembly 36 includes a nozzle 38 defining a flow channel 72, which is configured to direct a fluid flow onto the target zone 40, which in this embodiment is defined on the cutting surface 46 of the tool 24.

The nozzle assembly 36 is a part of a fluid system 78 (FIG. 1), that includes a manifold 80, a conduit 82 connected with the coolant nozzle 42, and a conduit 84 connected with the nozzle assembly 36. The manifold 80 is coupled with a pump 88, which delivers a fluid 76 (FIG. 4) under pressure. The conduit 84 includes a flex section 86 that enables movement of the nozzle assembly 36 relative to the manifold 80. The manifold 80 is configured to distribute proportions of the overall flow from the pump 88 to the conduits 82, 84 as required for the cooling and scrubber functions.

In other embodiments, additional or other nozzle applications may be configured to move to a preferred gap from a target zone. For example, the nozzle assembly 36 may be directed to a target zone on the workpiece 22, and/or the coolant nozzle 42 may be configured with the ability to move, such as with the spring 50. It is contemplated that the ability to enable a nozzle to automatically move to a position that directs a fluid toward a target zone on a workpiece and/or a tool that moves over time has application over a broad range of workpiece and tool operations. Accordingly, the aspects and features of the present disclosure are applicable to many types of fluid application situations, where a target for the fluid's application changes location over time.

Figure 4:
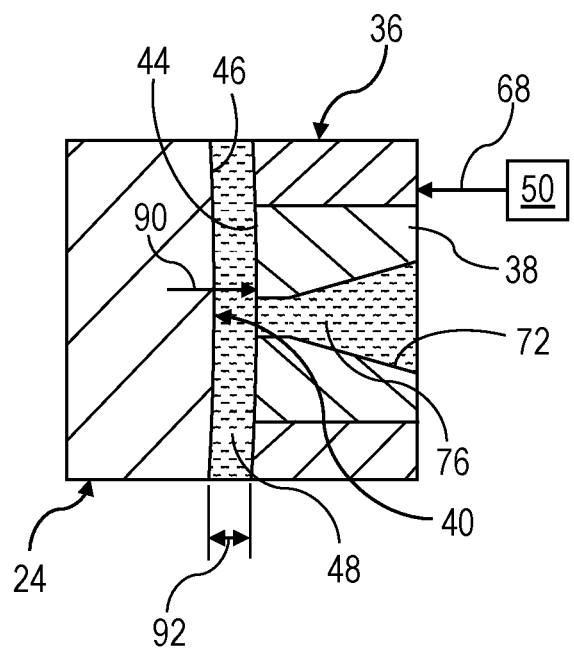
FIG. 4 is a schematic, detail illustration depicting the forces associated with the apparatus of FIG. 1 shown in a state with the tool rotating and fluid flowing through the nozzle assembly, in accordance with various embodiments.

Referring additionally to FIG. 4, when flow of the fluid 76 from the pump 88 is established through the flow channel 72 of the nozzle 38, a hydrodynamic force 90 is created as a positive pressure type force against the face 44 of the nozzle assembly 36 as a result of the fluid 76 being forced into the gap 48 between the tool 24 and the nozzle assembly 36. It will be appreciated that the flow of the fluid 76 is started before rotation of the tool 24 is initiated to lift the face 44 off the cutting surface 46 prior to cutting action being initiated. The hydrodynamic force 90 reduces as the nozzle assembly 36 moves away from the tool 24 due to the increasing flow area defined by the size 92 of the gap 48. The hydrodynamic force 90 may be a factor of the size 92 of the gap 48, flow rate of the fluid 76, speed of rotation of the tool 24, pressure, viscosity and temperature of the fluid 76, and other factors for a given application. The nozzle 38 may include a converging shape of the flow channel 72 toward the tool 24 with a reducing flow area for increased flow speed and pressure. The hydrodynamic force 90 may be determined at the preferred size 92 of the gap 48, such as three millimeters, by means such as measurement or calculation. To balance the hydrodynamic force 90 and result in a positioning of the face 44 of the nozzle assembly 36 at the preferred gap size 92 from the tool 24, the spring 50 has a spring rate selected to apply an equal force to that created as the hydrodynamic force 90 at the preferred size 92 of the gap 48. The spring 50 is selected to have a constant spring rate over the range of travel 52 of the nozzle assembly 36. For example, in the case of a grinding application where the tool 24 has a useable depth of abrasive, the range of travel 52 encompasses the thickness 32 of the abrasive layer 28 to provide adjustment and deliver the preferred gap 48 over the full range of travel 52. By balancing the force 68 of the spring 50 and the hydrodynamic force 90, the gap 48 may be set at a variety of sizes and the nozzle assembly 36 may be adjusted to ride in close proximity to the rotating tool 24 on a fluid layer for effective operation without contacting the moving tool 24.

Figure 5:
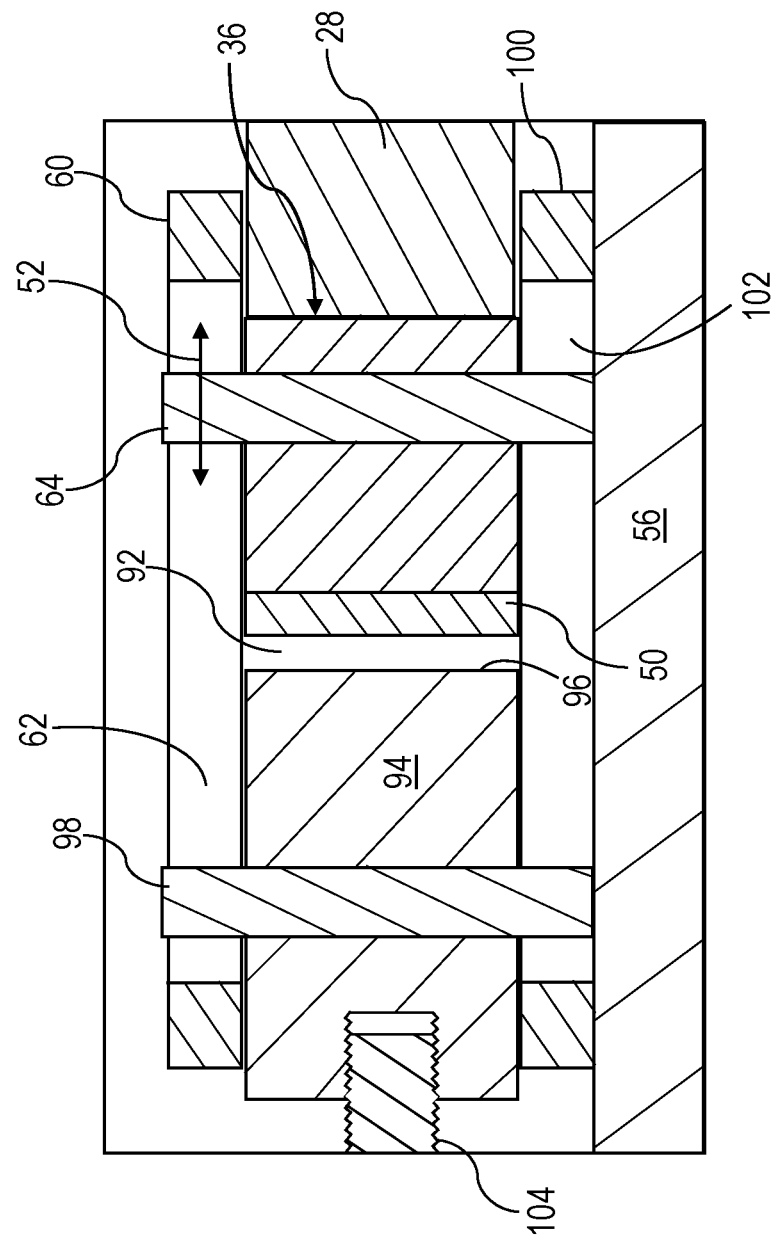
FIG. 5 is a schematic, detail illustration of the nozzle area of the apparatus of FIG. 1 including a stop, in accordance with various embodiments.

Referring to FIG. 5 along with FIG. 2, a stop 94 is associated with the nozzle assembly 36. The stop 94 is formed as a block with a surface 96 that faces the nozzle assembly 36. The spring 50 may be disposed between the surface 96 and the nozzle assembly 36. The stop 94 may be set relative to the spring 50 at an initial distance equal to the size 92 of preferred gap 48. The stop 94 is connected with a pin 98 that extends into the slot 62 of the guide 60. As is shown in FIG. 5, a second guide 100 may be included on an opposite side of the nozzle assembly 36 from the guide 60 for stability. The second guide 100 may also be fixed relative to the frame 56. The second guide 100 includes a slot 102 into which the pins 64, 98 extend, and has a shape that mirrors that of the guide 60. The stop 94 may follow the nozzle assembly 36 as it moves under action of the spring 50 as the abrasive layer 28 wears. A lock 104, which in the current embodiment comprises a mechanism such as a ratchet, that is configured to hold the stop 94 after it moves in increments toward the tool 24. The lock 104 permits the stop 94 to move with the nozzle assembly 36 toward the tool 24, but holds the stop 94 from moving away from the tool 24 and the nozzle assembly 36. The lock 104 may be released and backed-off/reset when the tool 24 is replaced with one having an unworn abrasive layer. In other embodiments, the lock 104 may be a mechanism such as a screw, a fluid cylinder or another incremental locking device or an active actuator to hold and/or move the stop 94. The stop 94 may be used as a redundant device to backup the balance of forces, or as a first line device to set the size 92 of the preferred gap 48.

Accordingly, an apparatus with automatic fluid nozzle repositioning includes a combination of mechanical and hydrodynamic aspects that provide a number of desirable results. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus for operating on a workpiece with a tool, the apparatus comprising:
   a nozzle assembly configured to convey a fluid to a target zone defined on at least one of the workpiece and/or the tool, wherein the target zone has a location that varies over time;
   a spring configured to apply a spring force to bias the nozzle assembly toward the target zone, the spring configured to move the nozzle assembly as the location of the target zone varies; and
   a stop disposed an initial distance from the nozzle assembly with the spring between the stop and the nozzle assembly, and the stop spaced away from the spring, the stop configured to limit movement of the nozzle assembly away from the tool in response to a hydrodynamic force,
   wherein the nozzle assembly is configured to move to a target position relative to the target zone by a combination of action of the spring force and of the hydrodynamic force of the fluid,
   wherein the stop is configured to prevent movement of the nozzle assembly away from the target zone more than the target position.

2. The apparatus of claim 1, wherein the tool includes a cutting surface, and wherein the position of the nozzle assembly is configured to vary as a result of wear of the cutting surface.

3. The apparatus of claim 1, comprising a guide engaging the nozzle assembly to direct movement of the nozzle assembly, wherein the guide includes a slot defining a path, wherein the nozzle assembly is configured to follow the path defined by the slot, and comprising a pin extending through the stop and disposed in the slot.

4. The apparatus of claim 1, wherein the position of the nozzle assembly is determined by a balance between the hydrodynamic force and the spring force.

5. The apparatus of claim 1, wherein the nozzle assembly is configured to contact the tool, when the tool is not rotating.

6. The apparatus of claim 1, wherein the tool comprises a grinding wheel.

7. The apparatus of claim 6, wherein the nozzle assembly comprises a scrubber nozzle configured to clean the grinding wheel.

8. The apparatus of claim 1, wherein the stop incudes a ratchet lock configured to allow the stop to move toward the tool but not away from the tool.

9. The apparatus of claim 1, wherein the spring comprises a leaf-type spring with a first end connected to a frame of the apparatus and a second end connected to the nozzle.

10. The apparatus of claim 1, comprising: a guide defining a slot; a first pin extending through the nozzle and into the slot; and a second pin extending through the stop and into the slot, wherein the slot of the guide is configured to guide the nozzle and the stop.

11. An apparatus for operating on a workpiece with a tool, the apparatus comprising:
    a nozzle assembly configured to convey a fluid to a target zone defined on at least one of the tool and/or the workpiece, wherein the target zone has a location that varies over time;
    a leaf-type spring configured to apply a spring force to bias the nozzle assembly toward the target zone, the leaf-type spring having a first end connected to a frame of the apparatus and a second end connected to the nozzle assembly, the leaf-type spring configured to move the nozzle assembly as the location of the target zone varies; and
    a guide, engaging the nozzle assembly to direct movement of the nozzle assembly, wherein the nozzle assembly is configured to move to a position relative to the target zone by a combination of action of the spring force and of a hydrodynamic force of the fluid.

12. The apparatus of claim 11, wherein the tool includes an abrasive layer, and wherein the position of the nozzle assembly is configured to vary as a result of wear of the abrasive layer.

13. The apparatus of claim 11, wherein the guide includes a slot, and comprising a pin on the nozzle assembly that extends into the slot.

14. The apparatus of claim 11, wherein the position of the nozzle assembly is determined by a balance between the hydrodynamic force and the spring force, wherein the balance sets the nozzle assembly at a predefined gap from the tool.

15. The apparatus of claim 11, wherein the nozzle assembly is configured to rest against the tool when the fluid is turned off to the nozzle assembly.

16. The apparatus of claim 11, wherein the guide defines a slot and comprising:
    a first pin extending through the nozzle and into the slot;
    a stop spaced from the nozzle and configured to limit movement of the nozzle in a direction away from the tool and/or the workpiece; and
    a second pin extending through the stop and into the slot, wherein the slot of the guide is configured to guide the nozzle and the stop.

17. The apparatus of claim 11, comprising a stop disposed an initial distance from the nozzle assembly, with the spring disposed between the stop and the nozzle assembly, and the stop spaced away from the spring, the stop configured to limit movement of the nozzle assembly away from the tool and/or the workpiece in response to the hydrodynamic force.

18. The apparatus of claim 11, comprising a stop spaced from the nozzle and configured to limit movement of the nozzle in a direction away from the tool and/or the workpiece, wherein the stop incudes a ratchet lock configured to allow the stop to move toward the tool but not away from the tool.

19. The apparatus of claim 11, wherein the action of the spring force is configured to maintain a predefined gap between the tool and the workpiece as the tool wears.

20. An apparatus for operating on a workpiece with a tool, the apparatus comprising:
    a grinding wheel;

a nozzle assembly configured to convey a fluid to a target zone defined on the grinding wheel, wherein the target zone has a location that varies over time as the grinding wheel wears;

a spring configured to apply a spring force to bias the nozzle assembly toward the target zone, the spring configured to move the nozzle assembly toward the grinding wheel as the location of the target zone varies as the grinding wheel wears;

a stop with a ratchet lock configured for the stop to move toward the grinding wheel as the grinding wheel wears but not away from the grinding wheel;

a guide engaging the nozzle assembly, the guide defining a slot configured to direct movement of the nozzle assembly and the stop, wherein the nozzle assembly is configured to follow the slot and to move to a position relative to the target zone by seeking a balance between the spring force and a hydrodynamic force of the fluid, when the fluid is moving, wherein the stop is configured to follow the slot when moving toward the grinding wheel.

\* \* \* \* \*